United States Patent
Kumarasamy et al.

(10) Patent No.: US 8,639,844 B2
(45) Date of Patent: Jan. 28, 2014

(54) SYSTEM FOR ESTABLISHING A MEDIA STREAM

(75) Inventors: Parameswaran Kumarasamy, San Jose, CA (US); Vijay Arumugam Kannan, Milpitas, CA (US); Sheshadri V. Shalya, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 314 days.

(21) Appl. No.: 12/840,038

(22) Filed: Jul. 20, 2010

(65) Prior Publication Data

US 2012/0023172 A1    Jan. 26, 2012

(51) Int. Cl.
*G06F 13/00* (2006.01)

(52) U.S. Cl.
USPC .......................................................... 709/239

(58) Field of Classification Search
USPC ................................. 370/254; 709/206, 239
See application file for complete search history.

(56) References Cited

U.S. PATENT DOCUMENTS

| | | |
|---|---|---|
| 2007/0019619 A1 | 1/2007 | Foster et al. |
| 2007/0025270 A1 | 2/2007 | Sylvain |
| 2007/0058639 A1 | 3/2007 | Khan |
| 2007/0189220 A1 | 8/2007 | Oberle et al. |

*Primary Examiner* — Robert B Harrell
(74) *Attorney, Agent, or Firm* — Brinks Gilson & Lione

(57) ABSTRACT

In one implementation, an intermediary receives a message from an endpoint, includes a flow around address and a flow through address to a second network device listed in the first message. The intermediary requests another endpoint to perform a connectivity test to determine the reachability of the originating endpoint. The connectivity test may be performed using methods such as ping, probe, interactive connectivity establishment (ICE), or session traversal utilities for network address translation (STUN). The intermediary may request originating endpoint a similar connectivity check and establish a media stream based on results of the connectivity tests. The media stream may be a voice over internet protocol (VoIP) call.

20 Claims, 5 Drawing Sheets

SYSTEM FOR ESTABLISHING A MEDIA STREAM

FIELD

The present embodiments relate to voice over internet protocol (VoIP).

BACKGROUND

A session border controller (SBC) assists in the connecting, conducting and disconnecting of media streams. In addition to multi-media services, such as VoIP and video conferencing, SBCs may provide other functions, such as security or traffic management. SBCs may implement session initiation protocol (SIP) for creating, modifying, and terminating sessions, which may include one or more media streams. SIP involves the selection of addresses and ports used by the source and destination of the media stream.

SBCs may be employed at the border between two networks to implement network policies. The network policies dictate the particular addresses and ports used for media in a VoIP session. In other words, SBCs are statically configured to provide specific addresses and ports in VoIP without regard to the actual reachability of the endpoints of the session. Problems may arise when the network policies do not match the actual reachability of the endpoints.

DETAILED DESCRIPTION

Overview

Figure 1:
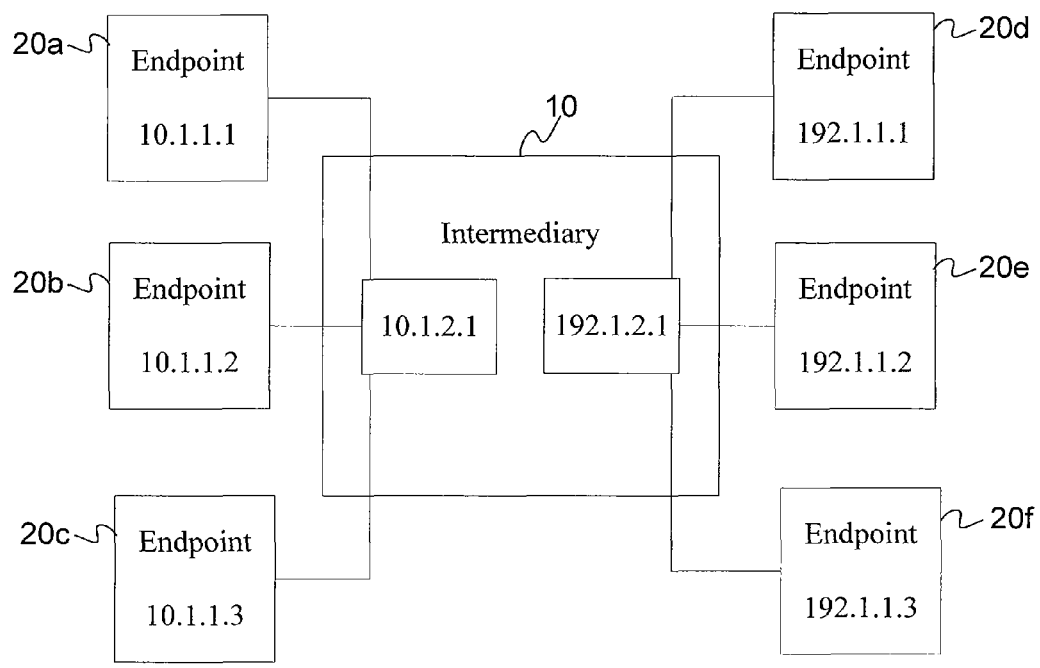
FIG. 1 illustrates one embodiment of a network configured to implement adaptive media handling.

In video conferencing, VoIP, and other applications, media streams flow between user agents, which also may be referred to as endpoints. The reachability between endpoints, which is the ability to make a connection between the endpoints, is determined by the location (network or physical) of the endpoints, which may be affected by firewalls, proxies, or other security devices. Reachability may change due to route changes determined by network policies related to, such as, low cost routing, the time of the day, or other policies. However, in many cases, an intermediary, such as a session border controller (SBC), is used to implement static network policies that dictate whether two endpoints communicate directly in media streaming applications or are forced to communicate through the intermediary. Rather than manual change of network policies, the intermediary may be configured to adaptively handle media so that the endpoints communicate based on the actual reachability of the endpoints.

In one aspect, a method includes receiving a first message from a first network device, forwarding a flow around address and a flow through address to a second network device listed in the first message, receiving a second message from the second network device, wherein the second message includes an indication of the reachability of the first network device with respect to the second network device, and sending the first network device a third message including the flow around address or the flow through address based on the indication of the reachability of the first network device with respect to the second network device.

In a second aspect, an apparatus includes an interface and a controller. The interface is operable to receive a first message from a first network device and forward a flow around address and a flow through address listed in the first message to a second network device. The controller is configured to arrange communication using either the flow around address or the flow through address based on an indication of the reachability of the first network device with respect to the second network device as received in a second message from the second network device.

In a third aspect, logic encoded in one or more non-transitory tangible media and executable by a processor and operable to send a request to a first network device to determine whether a second network device is reachable by the first network device, receive a result of the request, and establish a media stream between the first network device and the second network device based on the result of the request, wherein the media stream uses a flow through address when the second network device is not reachable by the first network device and the media stream uses a flow around address when the second network device is reachable by the first network device.

Example Embodiments

Session border controllers (SBCs) connect groups of voice over internet protocol (VoIP) networks. For control packet handling, SBCs terminate signaling from one endpoint and reoriginate the signaling for another endpoint using the SBCs address and port. For media packet handling, there are two methods: media flow through and media flow around. A network policy or configuration stored in the SBC determines whether a pair of endpoints utilizes media flow through or media flow around.

In media flow through, the SBC reoriginates the media packets, which means the SBC terminates the media packets from a first endpoint (user agent), removes the first endpoint's address and port from the media packets, and adds the SBC's address and port to the media packet as the source address. In media flow around, the media packets bypass the SBC and flow directly between endpoints. This saves the bandwidth and reduces load on the SBC, which increases the total number of calls that the SBC can handle.

The term "media" includes audio, video, or a combination of audio and video. The term "directly" means that the endpoints communicate using their respective addresses for the media packets as opposed to the address of the SBC or other intermediary device. There may also be intervening routers, hubs, gateways, and/or switches between the directly communicating endpoints, which may support media flow around or media flow through independently of the SBC.

In an alternative implementation of media flow around, the media packets may not physically "flow around" the SBC. Instead, the SBC may simply route the packets without reoriginating the packets. In other words, the media packets are routed by the SBC but no SBC functionality is applied to the media packets.

However, these benefits may be realized to the full potential only when the network configuration accurately matches the reachability of the endpoints of the media stream. The embodiments below do not rely on a static network configuration but instead dynamically adjust the type of communication between any two endpoints. The SBC may enable the endpoints to communicate using either media flow through or flow around according to the actual reachability of the endpoints at that particular time.

FIG. 1 illustrates one embodiment of a network configured to implement adaptive media handling. An intermediary 10 connects to three endpoints on network 192.x.x.x. An endpoint 20d is at address 192.1.1.1, an endpoint 20e is at address 192.1.1.2, and an endpoint 20f is at address 192.1.1.3. The intermediary 10 also has an address 192.1.2.1 on the 192.x.x.x network. Similarly, intermediary 10 connects to three endpoints on network 10.x.x.x. An endpoint 20a is at address 10.1.1.1, an endpoint 20b is at address 10.1.1.2, and an endpoint 20c is at address 10.1.1.3. The intermediary 10 also has an address 10.1.2.1 on the 10.x.x.x network. Any number of endpoints may be in communication with intermediary 10.

Figure 2:
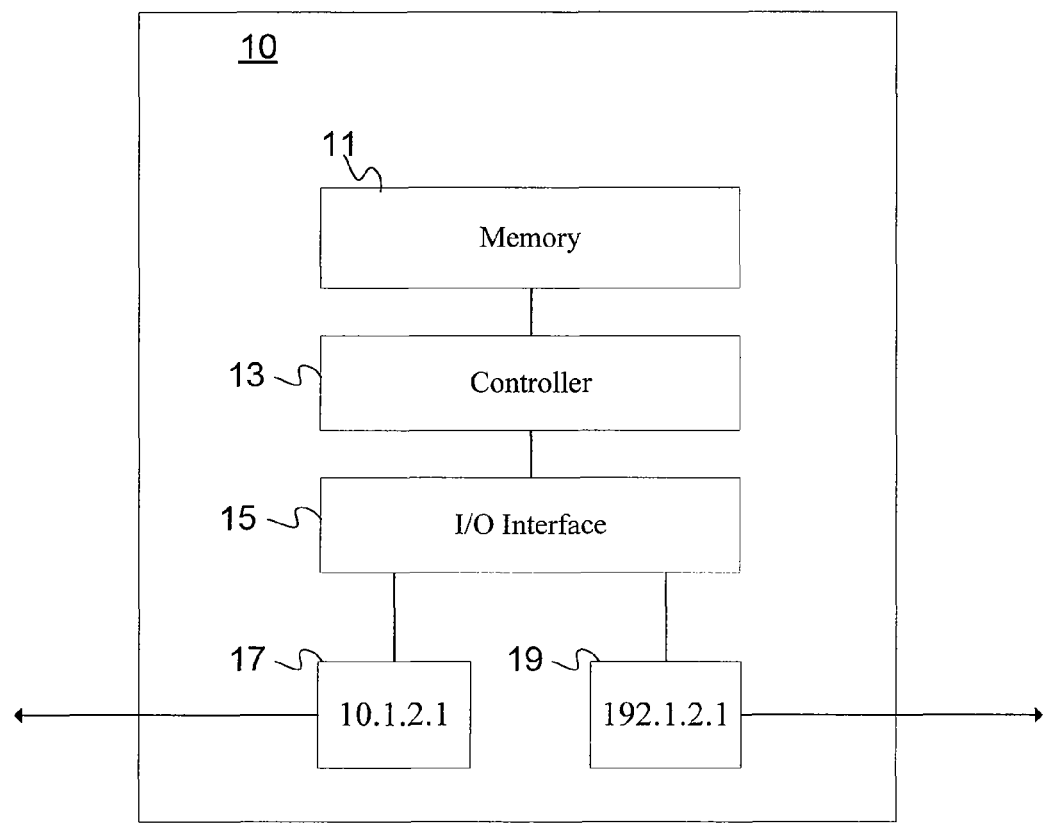
FIG. 2 illustrates one embodiment of a session border controller.

FIG. 2 illustrates one embodiment of the intermediary 10. The intermediary 10 includes a memory 11, a controller 13, and an input/output (I/O) interface 15. The I/O interface 15 includes a first network interface 17 and a second network interface 19. The first network interface 17 and the second network interface 19 may be configured for communication using internet protocol (IP), asynchronous transfer mode (ATM), frame relay (FR), or another communication protocol. The intermediary 10 may be an SBC. Alternatively, the intermediary 10 may be an SBC implemented on a router, a gateway, or a network address translation device. A specific example of the intermediary 10 is the Cisco Unified Border Element (CUBE). Alternatively, the embodiments disclosed may be implemented in the form of software on a router or other network device, such as a Cisco Unified Call Manager (CUCM), or on any Internet protocol private branch exchange (IP-PBX), which is a telephone system designed to deliver audio and/or video over a network in communication with the normal Public Switched Telephone Network (PSTN). Additional, different, or fewer components may be provided.

The I/O interface 15 sends and receives message from endpoints, which may be referred to as network devices, and forwards the messages to other endpoints. A message received from a calling endpoint may include a flow around address and a flow through address. The controller 13 inserts the address of the intermediary 10 as the flow through address and forwards the message to the recipient end point. The recipient end point determines whether the recipient end point can connect directly (reachability) to the calling endpoint and includes that information in a response to the intermediary 10, which is received by the I/O interface 15. The I/O interface 15 sends another message to the calling endpoint including the flow around address or the flow through address based on the indication of the reachability determined by the recipient end point. Additional details of the call negotiation are discussed below.

The memory 11 may store network policies in intermediary 10. The memory 11 may be a volatile memory or a non-volatile memory. The memory 11 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory. The memory 11 may include an optical, magnetic (hard drive) or any other form of data storage device. The memory 11 may be located in a remote device or removable, such as a secure digital (SD) memory card.

The memory 11 may store computer executable instructions. The controller 13 may execute computer executable instructions. The computer executable instructions may be included in computer code. The computer code may be stored in the memory 11. The computer code may be written in any computer language, such as C, C++, C#, Java, Pascal, Visual Basic, Perl, HyperText Markup Language (HTML), JavaScript, assembly language, extensible markup language (XML) and any combination thereof.

The computer code may be logic encoded in one or more tangible media or one or more non-transitory tangible media for execution by the controller 13. Logic encoded in one or more tangible media for execution may be defined as instructions that are executable by the controller 13 and that are provided on the computer-readable storage media, memories, or a combination thereof. Instructions for instructing a network device may be stored on any logic. As used herein, "logic," includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The instructions may be stored on any computer readable medium. A computer readable medium may include, but are not limited to, a floppy disk, a hard disk, an application specific integrated circuit (ASIC), a compact disk CD, other optical medium, a random access memory (RAM), a read only memory (ROM), a memory chip or card, a memory stick, and other media from which a computer, a processor or other electronic device can read.

The controller 13 may comprise a general processor, digital signal processor, application specific integrated circuit, field programmable gate array, analog circuit, digital circuit, server processor, combinations thereof, or other now known or later developed processor. The controller 13 may be a single device or combinations of devices, such as associated with a network or distributed processing. Any of various processing strategies may be used, such as multi-processing, multi-tasking, parallel processing, remote processing, centralized processing or the like. The controller 13 may be responsive to or operable to execute instructions stored as part of software, hardware, integrated circuits, firmware, micro-code or the like. The functions, acts, methods or tasks illustrated in the figures or described herein may be performed by the controller 13 executing instructions stored in the memory 11. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The I/O interface 15 may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other or through one or more intermediate entities (e.g., processor, operating system, logic, software). Logical and/or physical communication channels may be used to create an operable connection.

For example, the I/O interface 15 may comprise a first communication interface devoted to sending data, packets, or datagrams and a second communication interface devoted to receiving data, packets, or datagrams. Alternatively, the I/O interface 15 may be implemented using a single communication interface.

The endpoints 20a-f may be any type of network device configured to send and receive media streams. The endpoints 20a-f may include a memory, a controller, and an I/O interface similar to that described above with respect to the intermediary 10. For example, the endpoints 20a-f may be a personal computer configured to execute IP phone or video conferencing software. Alternately, any of endpoints 20a-f may be a standalone IP phone, including a mobile IP phone, or video conference device.

The intermediary 10 facilitates the negotiation of the media stream. A first endpoint (network device) sends a message to the intermediary 10, which requests communication with a second endpoint. The intermediary 10 identifies a flow around address, corresponding to the first endpoint, and a flow through address, corresponding to the intermediary 10. The intermediary 10 sends the flow around address and the flow through address to the second endpoint. The second endpoint determines the reachability of the first endpoint with respect to the second endpoint and relays that information to the intermediary 10. Thus, the intermediary 10 may advertise two addresses (flow-through and flow-around) towards the first endpoint. The intermediary 10 may then negotiate the connection for the media stream connection according to the dynamic reachability of the endpoints.

Figure 3:
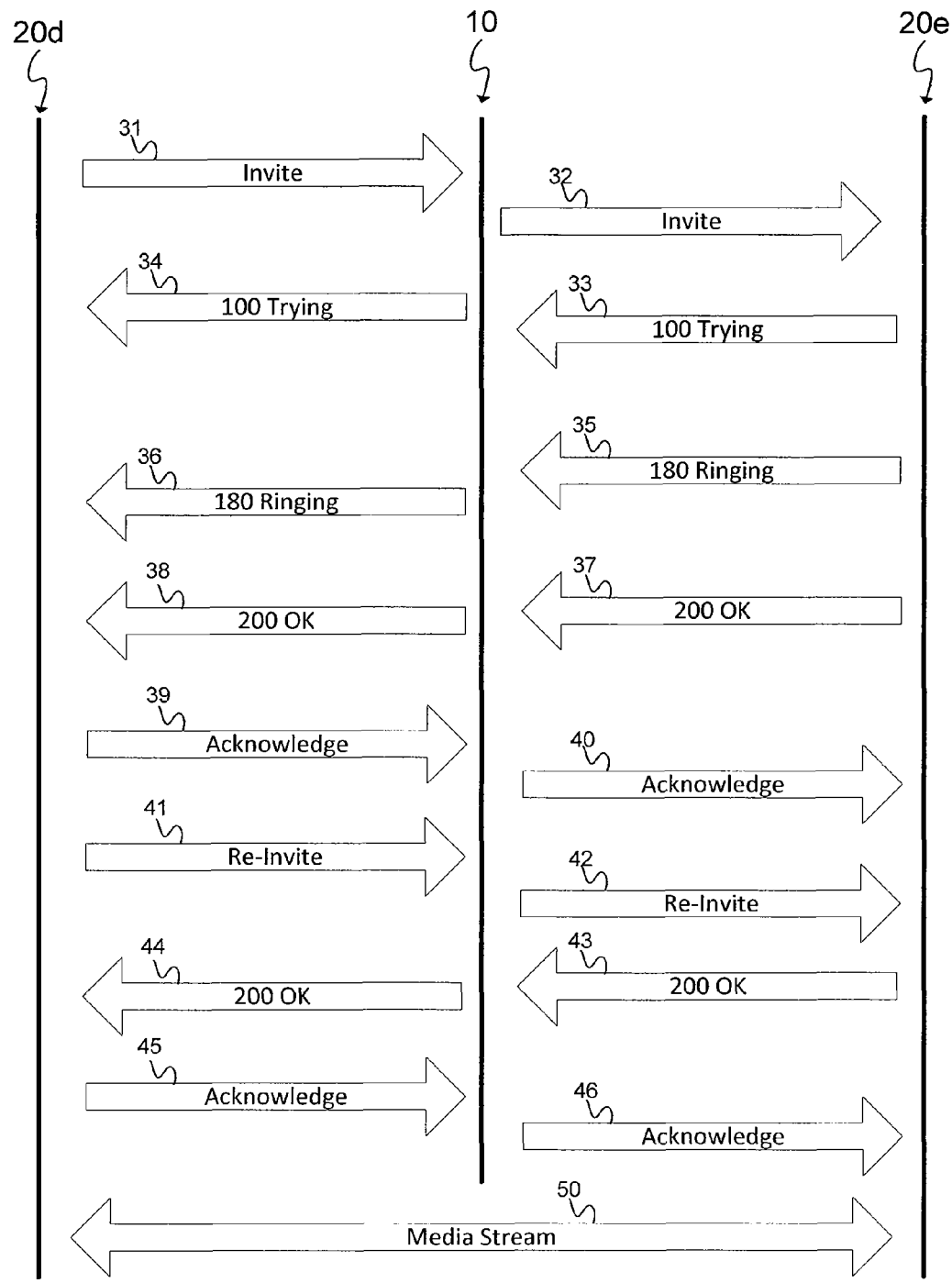
FIG. 3 illustrates one embodiment of adaptive media handling using session initiation protocol.

FIG. 3 illustrates a more detailed view of adaptive media handling using the offer/answer model with session description protocol (SDP) in connection with SIP. While the offer/answer model is shown in detail, any protocol capable of establishing connections for media stream may be used. FIG. 3 illustrates a call initiated by endpoint 20d to endpoint 20e.

First, endpoint 20d sends an invite message 31 (offer) to the intermediary 10. An example invite message 31 may be:
v=0
o=CiscoSystemsSIP-UA2-User-Agent 9335 5415 IN IP4 192.1.1.1
s=SIP Call
c=IN IP4 192.1.1.1
t=0 0
m=audio 49170 RTP/AVP 0
a=rtpmap: 0 PCMU/8000

When the intermediary 10 receives the invite message 31 from endpoint 20d, the intermediary 10 identifies that both flow through and flow around media handling may be used and introduces a new attribute, labeled fcap, into the offer message. The new offer message is referred to as invite message 32, as shown in FIG. 3. An example invite message 32 may be:
v=0
o=CiscoSystemsSIP-CUBE-UserAgent 9335 5415 IN IP4 192.1.2.1
s=SIP Call
c=IN IP4 192.1.2.1
t=0 0
m=audio 39130 RTP/AVP 0
a=rtpmap: 0 PCMU/8000
a=fcap:1 IP4 192.1.1.1 49170→Flow Around Address (desired)
a=fcap:2 IP4 192.1.2.1 39130→Flow Through Address The order of the fcap addresses may indicate a preference of one address over the other. For example, in invite message 32 above, fcap:1 for flow around addressed is preferred over fcap:2 for the flow through address. The preference may be that of endpoint 20d or may be determined by intermediary 10 according to a network policy that is manually or automatically configured. The endpoint 20e may immediately respond to the invite message 32 by sending a status 100 trying message 33. The status 100 trying message 33 indicates that the endpoint 20e has received the invite message 33. The status 100 trying message 34 is sent by intermediary 10 to endpoint 20d as a response to the invite message 32. The status 100 trying message 34 may be sent before the status 100 trying message 34.

When the endpoint 20e receives invite message 32, the endpoint 20e may determine a reachability of endpoint 20d with respect to endpoint 20e (i.e., whether endpoint 20e is capable of directly connecting to endpoint 20d). The endpoint 20e identifies endpoint 20d from the fcap attribute in invite message 32. The endpoint 20e determines reachability of endpoint 20d with respect to endpoint 20e using a connectivity utility to perform a connectivity check. The connectivity utility may be ping, trace, probe, interactive connectivity establishment (ICE), or session traversal utilities for network address translation (STUN). The endpoint 20e retrieves the address of endpoint 20d from the invite message 32 and queries the connectivity utility using the address of endpoint 20d.

If endpoint 20e determines that endpoint 20d is reachable (i.e., the connectivity utility successfully reaches the address 192.1.1.1 of endpoint 20d), the flow around address is used in the connection line in the answer message. If endpoint 20e determines that endpoint 20d is not reachable (i.e., the connectivity utility does not successfully reach the address 192.1.1.1 of endpoint 20d), the flow through address is used in the connection line in the answer message. In addition, the endpoint 20e may adjust the fcap attribute with port 0. The answer message may include a status 180 ringing message 35, a status 200 OK message 37, or both. The intermediary 10 may forward the status 180 ringing message 35 as status 180 ringing message 36. An example answer message 37 is shown below:
v=0
o=CiscoSystemsSIP-UA4-UserAgent 9335 5415 IN IP4 192.1.1.2
s=SIP Call
c=IN IP4 192.1.1.2
t=0 0
m=audio 30001 RTP/AVP 0
a=rtpmap: 0 PCMU/8000
a=fcap:1 IP4 192.1.1.2 40001→Flow Around Address(desired)
a=fcap:2 IP4 192.1.1.2 30001→Flow Through Address The answer message 37 may also identify the ports of endpoint 20e that may be used in the media stream. In the above example, endpoint 20e answers that the fcap:1 address is reachable and endpoint 20e is willing to receive media at port 40001. If endpoint 20d is sending media using fcap:2 (flow through address), endpoint 20e is willing to receive media at port 30001. The endpoint 20e may choose the same or different IPv4 addresses and ports depending upon the interface administration stored in the memory of endpoint 20e. IPv6 may also be used.

When the intermediary 10 receives the answer message 37, the intermediary 10 is configured to identify the reachability of endpoint 20d with respect to endpoint 20e. For a two way media stream, the intermediary 10 also identifies reachability in the other direction, which is the reachability of endpoint 20e as determined by endpoint 20d. Accordingly, the intermediary 10 modifies the answer message 37 by adding an fcap attribute. An example modified answer message 38 is shown below:
v=0
o=CiscoSystemsSIP-CUBE-UserAgent 9335 5415 IN IP4 192.1.2.1
s=SIP Call
c=IN IP4 192.1.2.1
t=0 0
m=audio 30101 RTP/AVP 0
a=rtpmap: 0 PCMU/8000
a=fcap:1 IP4 192.1.1.2 40001-→Flow Around Address(desired)
a=fcap:2 IP4 192.1.2.1 30101-→Flow Through Address When the endpoint 20d receives modified answer message 38, the endpoint 20d may determine reachability of endpoint 20d with respect to endpoint 20e (i.e., whether endpoint 20d is capable of directly connecting to endpoint 20e). The endpoint 20d identifies endpoint 20e from the fcap attribute in modified answer message 38. The endpoint 20d determines reachability with respect to endpoint 20e using a connectivity utility such as ping, trace, probe, ICE, or STUN.

The endpoint 20d may also send an acknowledgment (ACK) message 39 back to endpoint 20e to indicate that the handshake is done and a call is established. The acknowledgement is forwarded as ACK message 40 to endpoint 20e by intermediary 10. However, the ACK message 39 may be immediately followed by a re-invite message 41.

If endpoint 20d determines that endpoint 20e is reachable (i.e., the connectivity utility successfully reaches the address 192.1.1.2 of endpoint 20e), the endpoint 20d uses the flow around address as the answer port. The endpoint 20d sends the reachability information to the intermediary 10 using the re-invite message 41. An example of a re-invite message is as follows:
v=0
o=CiscoSystemsSIP-UA2-UserAgent 9335 5415 IN IP4 192.1.1.1
s=SIP Call
c=IN IP4 192.1.1.1
t=0 0
m=audio 49170 RTP/AVP 0
a=rtpmap: 0 PCMU/8000
a=fcap:1 IP4 193.1.1.1 49170-→Flow Around Address (Used)
a=fcap:2 IP4 192.1.1.1 0-→Flow Through Address(Not Used)

While not shown, if endpoint 20d determines that endpoint 20e is not reachable (i.e., the connectivity utility cannot successfully reach the address 192.1.1.2 of endpoint 20e), the endpoint 20d updates the corresponding fcap attribute with port 0 and updates the connection line with the address corresponding to the flow through address.

When the intermediary 10 receives the re-invite message 41 from the endpoint 20d, the intermediary 10 advertises the port/address specified by endpoint 20d to endpoint 20e by optionally modifying and forwarding as re-invite message 42. The following is an example of re-invite message 42 including the fcap attributes, but the fcap attributes may be omitted:
v=0
o=CiscoSystemsSIP-CUBE-UserAgent 9335 5415 IN IP4 192.1.2.1
s=SIP Call
c=IN IP4 192.1.1.1
t=0 0
m=audio 49170 RTP/AVP 0
a=rtpmap: 0 PCMU/8000
a=fcap:1 IP4 192.1.1.1 49170-→Flow Around Address (Used)
a=fcap:2 IP4 192.1.2.1 0-→Flow Through Address (Not Used)

The endpoint 20e may respond by sending a status 200 OK message 43 including the valid address/port combination to the intermediary 10. An example of the status 200 OK message 43 is shown by the following:
v=0
o=CiscoSystemsSIP-UA4-UserAgent 9335 5415 IN IP4 192.1.1.2
s=SIP Call
c=IN IP4 192.1.1.2
t=0 0
m=audio 40001 RTP/AVP 0
a=rtpmap: 0 PCMU/8000

The intermediary 10 forwards the status 200 OK message 43 including the valid address/port combination to endpoint 20d as status 200 OK message 44. The endpoint 20d may respond by sending an ACK message 45, which may be forwarded by intermediary 10 as ACK message 46. An example of status 200 OK message 43 is shown by the following:
v=0
o=CiscoSystemsSIP-UA4-UserAgent 9335 5415 IN IP4 192.1.2.1
s=SIP Call
c=IN IP4 192.1.1.2
t=0 0
m=audio 40001 RTP/AVP 0
a=rtpmap: 0 PCMU/8000

The preceding series of messages under the offer/answer model are one example of dynamically negotiating the flow around addresses and ports between endpoint 20d and endpoint 20e based on the reachability of endpoint 20d and endpoint 20e. The resulting media stream 50 illustrated in FIG. 3, may be any type of media stream such as real time transfer protocol (RTP), compressed RTP (cRTP), or secure RTP (SRTP).

In addition to reachability, media route selections may be made based on bandwidth, delay, load, media services required or policy configurations. In addition, media route selections may be made based on reachability in combination with bandwidth, delay, load, media services required and/or network policy configurations.

One example where the network policy configuration may override the media route selection based on reachability occurs when the endpoints send dual-tone multi-frequency (DTMF) signals differently. For example, if endpoint 20d send DTMF signals in-band (in the media path), and endpoint 20e sends DTMF signals out-of-band (in the signaling path), the intermediary 10 converts DTMF signals from in-band to out-of-band and vice versa. The intermediary 10 may choose not to allow media flow around so that the intermediary 10 can perform DTMF conversion.

Another example where the network policy configuration may override the media route selection may occur for security reasons. For example, a network may have a policy configuration that requires that network addresses are not made public. In order to prevent release of network addresses, the intermediary 10 may choose not to allow media flow around method.

Figure 4:
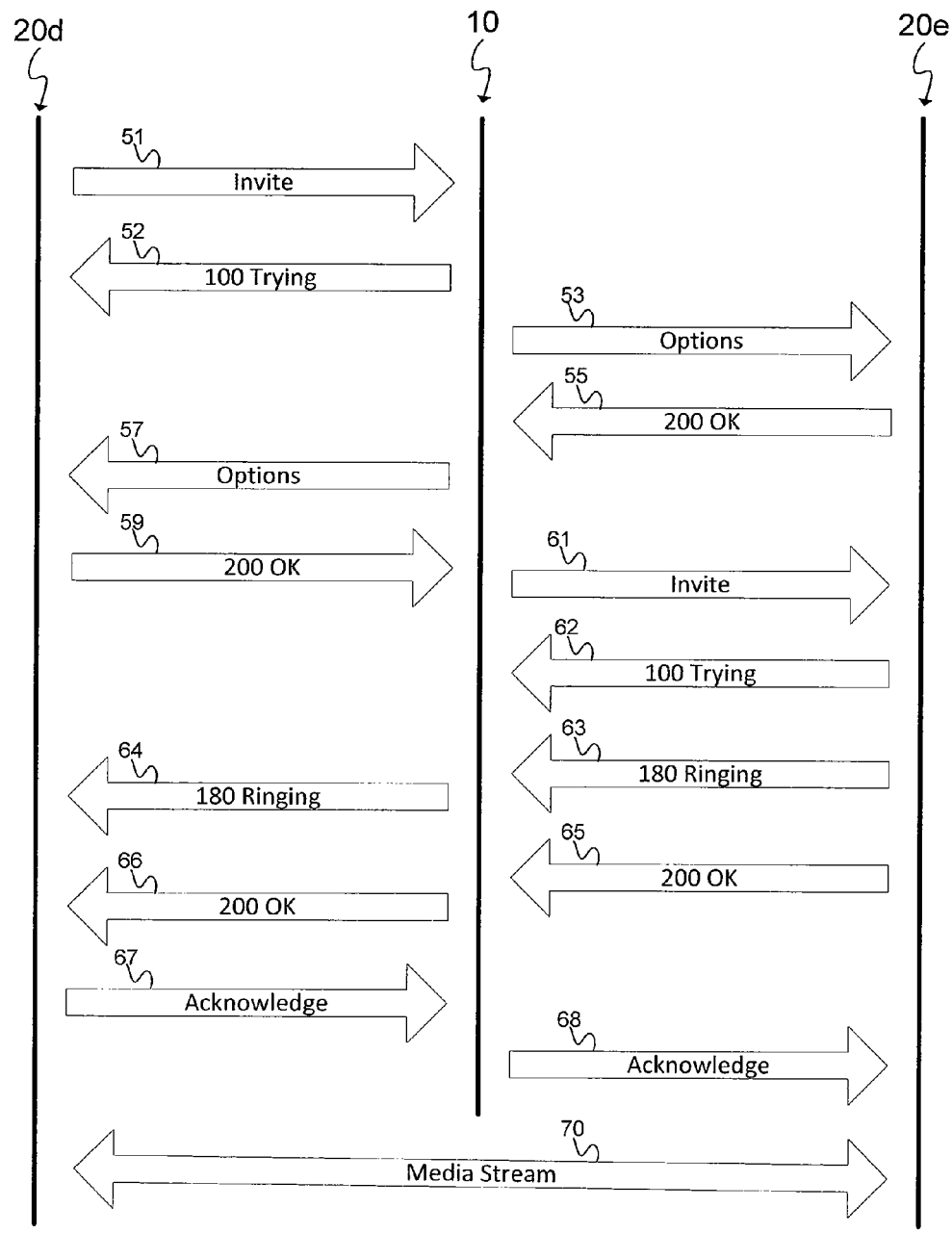
FIG. 4 illustrates another embodiment of adaptive media handling using session initiation protocol.

FIG. 4 illustrates another embodiment of adaptive media handling using SIP. In the embodiment shown in FIG. 4, the intermediary 10 employs adaptive media handling using the SIP method OPTIONS to determine the reachability of each of the endpoints involved in the call. The SIP method OPTIONS allows an endpoint to query another endpoint to discover information about the supported methods, content types, extensions, capabilities, codecs, without ringing the other endpoint.

FIG. 4 illustrates a call initiated by endpoint 20d to endpoint 20e. As discussed above, endpoint 20d and endpoint 20e may be on the same or different networks. First, endpoint 20d sends an invite message 51 (offer) to endpoint 20e:

v=0
o=CiscoSystemsSIP-UA2-UserAgent 9335 5415 IN IP4 192.1.1.1
s=SIP Call
c=IN IP4 192.1.1.1
t=0 0
m=audio 49170 RTP/AVP 0
a=rtpmap: 0 PCMU/8000

Upon receiving the invite message 51, the intermediary 10 may respond to endpoint 20d with a status 100 trying message 52. The intermediary 10 uses the adaptive media handling algorithm to determine that intermediary 10 may negotiate either flow-around or flow-through. The intermediary 10 includes a fcap attribute in an OPTIONS message. An example OPTIONS message 53 is shown below:

OPTIONS sip:UA-4@example.com SIP/2.0
Via: SIP/2.0/UDP pc33.atlanta.com;branch=z9hG4bKhjhs8ass877
Max-Forwards: 70
To: <UA-4:ua4@chicago.com>
From: UA-2<sip:UA-2@atlanta.com>;tag=1928301774
Call-ID: a84b4c76e66710
CSeq: 63104 OPTIONS
Contact: <sip:CUBE@pc33.atlanta.com>
Accept: application/sdp
Content-Type: application/sdp
Content-Length: 274
v=0
o=CiscoSystemsSIP-CUBE-UserAgent 9335 5415 IN IP4 192.1.2.1
s=SIP Call
c=IN IP4 192.1.2.1
t=0 0
m=audio 39130 RTP/AVP 0
a=rtpmap: 0 PCMU/8000
a=fcap:1 IP4 192.1.1.1 49170→Flow Around Address(desired)
a=fcap:2 IP4 192.1.2.1 39130→Flow Through Address When endpoint 20e identifies that it has received OPTIONS message 53 including an fcap attribute, the endpoint 20e determines reachability to endpoint 20d. The endpoint 20e identifies endpoint 20d from the fcap attribute in the OPTIONS message 53. The endpoint 20e determines reachability with respect to endpoint 20d using a connectivity utility such as ping, trace, probe, ICE, or STUN to perform a connectivity check.

If endpoint 20e determines that endpoint 20d is reachable (i.e., the connectivity utility successfully reaches the address 192.1.1.1 of endpoint 20d), the flow around address is used in the connection line in the answer message. If endpoint 20e determines that endpoint 20d is not reachable (i.e., the connectivity utility does not successfully reach the address 192.1.1.1 of endpoint 20d), the flow through address is used in the connection line in the answer message. In addition, the endpoint 20e may adjust the fcap attribute with port 0. For example, the answer message may be a status 200 OK message 55:

SIP/2.0 200 OK
Via: SIP/2.0/UDP pc33.atlanta.com;branch=z9hG4bKhjhs8ass877
To: <UA-4:ua4@chicago.com>
From: UA-2<sip:UA-2@atlanta.com>;tag=1928301774
Call-ID: a84b4c76e66710
CSeq: 63104 OPTIONS
Contact: <sip:ua-4@chicago.com>
Contact: <mailto:ua-4@chicago.com>
Allow: INVITE, ACK, CANCEL, OPTIONS, BYE
Accept: application/sdp
Accept-Encoding: gzip
Accept-Language: en
Supported: foo
Content-Type: application/sdp
Content-Length: 274
v=0
o=CiscoSystemsSIP-UA4-UserAgent 9335 5415 IN IP4 192.1.1.2
s=SIP Call
c=IN IP4 192.1.1.2
t=0 0
m=audio 30001 RTP/AVP 0
a=rtpmap: 0 PCMU/8000
a=fcap:1 IP4 192.1.1.2 40001→Flow Around Address(desired)
a=fcap:2 IP4 192.1.1.2 30001→FlowThrough Address The status 200 OK message 55 above indicates that endpoint 20e is capable of reaching fcap:1 address, and endpoint 20e accepts media at port 40001. If endpoint 20d sends media using fcap:2 address, endpoint 20e accepts media at port 30001. The endpoint 20e could choose the same or different IPv4 addresses and ports depending upon an interface administration of endpoint 20e.

After receiving the status 200 OK message 55, the intermediary 10 has identified the reachability of endpoint 20d with respect to endpoint 20e. For a two way media stream, the next step is for the intermediary 10 to identify the reachability of endpoint 20e with respect to endpoint 20d. The intermediary 10 generates another OPTIONS message 57 including an fcap attribute and sends the OPTIONS message 57 to endpoint 20d. An example of OPTIONS message 57 is as follows:

OPTIONS sip:UA-4@example.com SIP/2.0
Via: SIP/2.0/UDP pc33.atlanta.com;branch=z9hG4bKhjhs8ass877
Max-Forwards: 70
To: <UA-4:ua4@chicago.com>
From: UA-2<sip:UA-2@atlanta.com>;tag=1928301774
Call-ID: a84b4c76e66710
CSeq: 63104 OPTIONS
Contact: <sip:CUBE@pc33.atlanta.com>
Accept: application/sdp
Content-Type: application/sdp
Content-Length: 274
v=0
o=CiscoSystemsSIP-CUBE-UserAgent 9335 5415 IN IP4 192.1.2.1
s=SIP Call
c=IN IP4 192.1.2.1
t=0 0
m=audio 39130 RTP/AVP 0
a=rtpmap: 0 PCMU/8000 a=fcap:1 IP4 192.1.1.2 40001→Flow Around Address(desired)
a=fcap:2 IP4 192.1.2.1 39132→Flow Through Address After receiving the OPTIONS message 57, the endpoint 20d determines its reachability with endpoint 20e using a connectivity utility such as ping, trace, probe, ICE, or STUN. Although not shown, in the case endpoint 20d cannot reach endpoint 20e, endpoint 20d updates the fcap attribute with port 0 and updates the connection line with the address corresponding to the flow through address.

In the case that endpoint 20d can reach endpoint 20e by querying the connectivity utility with address 192.1.1.2, endpoint 20d uses address 192.1.1.2 in the connection line and includes the fcap attribute in a status 200 OK message 59 according to the following example:

SIP/2.0 200 OK
Via: SIP/2.0/UDP pc33.atlanta.com; branch=z9hG4bKhjhs8ass87;
To: <UA-4:ua4@chicago.com>
From: UA-2<sip:UA-2@atlanta.com>;tag=1928301774
Call-ID: a84b4c76e66710
CSeq: 63104 OPTIONS
Contact: <sip:ua-2@chicago.com>
Contact: <mailto:ua-2@chicago.com>
Allow: INVITE, ACK, CANCEL, OPTIONS, BYE
Accept: application/sdp
Accept-Encoding: gzip
Accept-Language: en
Supported: foo
Content-Type: application/sdp
Content-Length: 274
v=0
o=CiscoSystemsSIP-UA2-UserAgent 9335 5415 IN IP4 192.1.1.1
s=SIP Call
c=IN IP4 192.1.1.1
t=0 0
m=audio 49170 RTP/AVP 0
a=rtpmap: 0 PCMU/8000
a=fcap:1 IP4 192.1.1.1 49170----→Flow Around Address
a=fcap:2 IP4 192.1.1.1 49170----→Flow Through Address The status 200 OK message 59 above indicates that endpoint 20d can reach the fcap:1 address and accepts media at port 49170. If endpoint 20e sends media using the fcap:2, address, endpoint 20d has chosen to send the media using the same address and port. The endpoint 20d could choose the same or different IPv4 addresses and ports depending upon an interface administration of endpoint 20e.

Using the example shown in FIG. 4, the intermediary 10 has identified the reachability of the endpoints before a call has even been connected or established. The intermediary may then proceed with call or other media setup using the determined address port in SDP. For example, in response to invite message 61, endpoint 20e may send a status 100 trying message 100 and subsequently, a status 180 ringing message 63, which is forwarded by the intermediary 10 to endpoint 20d as status 180 ringing message 64. The endpoint 20e may also send a status 200 OK message 65, which is forward to endpoint 20d as status 200 OK message 66 by the intermediary 10. The endpoint 20d may respond with an acknowledge (ACK) message 67, which is forwarded to endpoint 20e as ACK message 68. A resulting media stream 70 may be RTP, SRTP, or another format. Alternatively, other call or media setup is handled concurrently.

In another example, one of the endpoints may transfer the media stream to another endpoint. This is most easily seen in the case of VoIP where calls are transferred or forwarded. For example, the resulting media stream discussed above between endpoint 20d and endpoint 20e may be a VoIP call. Even though endpoints 20e and 20d can directly connect and use the media flow around method, the same may not be true for endpoint 20a.

Therefore, if endpoint 20d transfers the call to endpoint 20a, the above media handling algorithm repeats. If the result is that endpoint 20a and endpoint 20d cannot connect directly, the media stream dynamically switches to the media flow through method. If the call was transferred back to endpoint 20d, the media stream would switch back to the media flow around method.

Other protocols besides the offer/answer model in connection with SIP may be used in adaptive media handling. For example, the H.323 protocol released by the ITU Telecommunication Standardization Sector on July 2006 and available at http://www.itu.int is another protocol capable of providing audio/video media streams on a packet network. The H.323 also addresses call signaling and control, multimedia transport and control, and bandwidth control for point-to-point and multi-point conferences. As another example, media gateway control protocol (MGCP) may also be used to perform the adaptive media handling as described above. MGCP is defined in RFC 2805 released April 2000 and available at http://tools.ietf.org/html/rfc2805. In addition to SIP, H.323, and MGCP, any method or system of providing media streams on a network may utilize the adaptive media handling algorithm.

Figure 5:
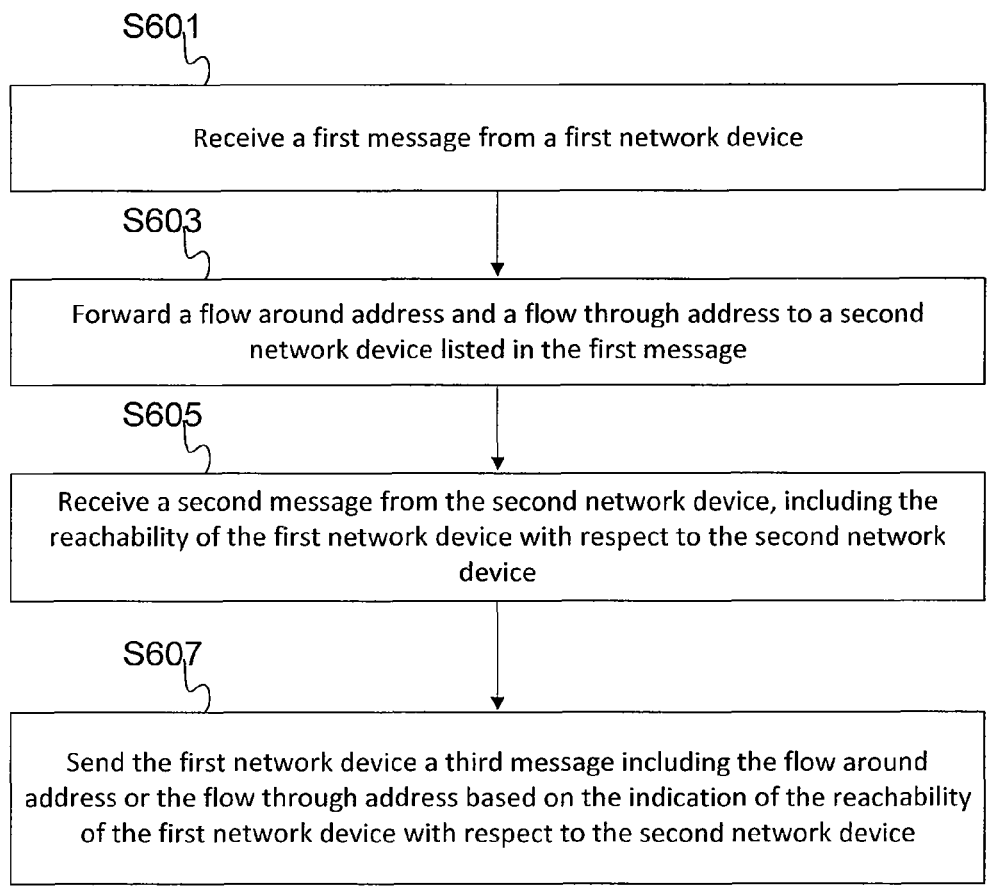
FIG. 5 illustrates a flow chart for the adaptive media handling algorithm.

FIG. 5 Illustrates a flow chart for the adaptive media handling algorithm. The method is implemented by the network of FIG. 1, the intermediary of FIG. 2, both, or other networks and/or intermediaries. Additional, different, or fewer acts may be provided.

At block S601, the intermediary 10 receives a first message from a first network device. The first message includes a flow around address and a flow through address for the first network device. At block S603, the intermediary 10 forwards the flow around address and the flow through address to a second network device, which may be listed in the first message. At block S605, the intermediary 10 receives a second message from the second network device, and the second message includes an indication of the reachability of the first network device with respect to the second network device. As block S607, the intermediary 10 sends the first network device a third message including the flow around address or the flow through address based on the indication of the reachability of the first network device with respect to the second network device.

Using the adaptive media handling algorithm, the intermediary 10 determines the media mode dynamically based on the endpoint's capability, reachability and the network's policy configuration. If media flow around is used whenever possible, the media switching delay (media hairpin) is reduced and the load on the intermediary is reduced, freeing up more bandwidth for additional media streams. Further, packet loss may be reduced because of the decrease in delay and because the shortest possible media path is used. A reduction in packet loss results in better voice quality.

Various embodiments described herein can be used alone or in combination with one another. The foregoing detailed description has described only a few of the many possible implementations of the present invention. For this reason, this detailed description is intended by way of illustration, and not by way of limitation.

We claim:

1. An intermediary device, comprising:
   an interface configured to receive a message from a first endpoint device, the message including a flow around address and a flow through address to a second endpoint device;
   memory, communicatively coupled to the interface, configured to store the received message; and
   a processor, communicatively coupled to the memory and the interface, configured to:
   request, via the interface, the first endpoint device to perform a connectivity test to determine reachability of the second endpoint device; and
   establish, via the interface, a media stream between the first endpoint device and the second endpoint device via the flow around address or the flow through address based on results of the connectivity test.

2. The device of claim 1, wherein the connectivity test is a first connectivity test, and wherein the processor is further configured to request, via the interface, the second endpoint device to perform a second connectivity test to determine reachability of the first endpoint device.

3. The device of claim 2, wherein the processor is further configured to establish the media stream between the first endpoint device and the second endpoint device via the flow around address or the flow through address based on results of the second connectivity test.

4. The device of claim 2, wherein the processor is further configured to: establish the media stream between the first endpoint device and the second endpoint device via the flow around address or the flow through address based on results of the first connectivity test and the second connectivity test.

5. The device of claim 2, wherein the processor is further configured to:
   request, via the interface, the first endpoint device to perform the connectivity test, via one or more pings, to determine reachability of the second endpoint device; and
   establish the media stream between the first endpoint device and the second endpoint device via the flow around address or the flow through address based on results of the one or more pings.

6. The device of claim 2, wherein the processor is further configured to:
   request, via the interface, the first endpoint device to perform the connectivity test, via one or more probes, to determine reachability of the second endpoint device; and
   establish the media stream between the first endpoint device and the second endpoint device via the flow around address or the flow through address based on results of the one or more probes.

7. The device of claim 2, wherein the processor is further configured to:
   request, via the interface, the first endpoint device to perform the connectivity test, via interactive connectivity establishment (ICE), to determine reachability of the second endpoint device; and
   establish the media stream between the first endpoint device and the second endpoint device via the flow around address or the flow through address based on results of the connectivity test via ICE.

8. The device of claim 2, wherein the processor is further configured to:
   request, via the interface, the first endpoint device to perform the connectivity test, via session traversal utilities for network address translation (STUN), to determine reachability of the second endpoint device; and
   establish the media stream between the first endpoint device and the second endpoint device via the flow around address or the flow through address based on results of the connectivity test via STUN.

9. The device of claim 2, wherein the processor is further configured to establish a voice over internet protocol (VoIP) call between the first endpoint device and the second endpoint device via the flow around address or the flow through address based on results of the connectivity test.

10. A method, comprising:
    receiving, at a processor, a message from a first endpoint device, the message including a flow around address and a flow through address to a second endpoint device;
    requesting, by the processor, the first endpoint device to perform a connectivity test to determine reachability of the second endpoint device;
    and
    establishing, by the processor, a media stream between the first endpoint device and the second endpoint device via the flow around address or the flow through address based on results of the connectivity test.

11. The method of claim 10, wherein the connectivity test is a first connectivity test, and wherein the method further comprises requesting the second endpoint device to perform a second connectivity test to determine reachability of the first endpoint device.

12. The method of claim 11, further comprising establishing the media stream between the first endpoint device and the second endpoint device via the flow around address or the flow through address based on results of the second connectivity test.

13. The method of claim 11, further comprising establishing the media stream between the first endpoint device and the second endpoint device via the flow around address or the flow through address based on results of the first and the second connectivity test.

14. The method of claim 10, further comprising:
    requesting the first endpoint device to perform the connectivity test, via one or more pings, to determine reachability of the second endpoint device; and
    establishing the media stream between the first endpoint device and the second endpoint device via the flow around address or the flow through address based on results of the one or more pings.

15. The method of claim 10, further comprising:
    requesting the first endpoint device to perform the connectivity test, via one or more probes, to determine reachability of the second endpoint device; and
    establishing the media stream between the first endpoint device and the second endpoint device via the flow around address or the flow through address based on results of the one or more probes.

16. The method of claim 10, further comprising:
    requesting the first endpoint device to perform the connectivity test, via interactive connectivity establishment (ICE), to determine reachability of the second endpoint device; and
    establishing the media stream between the first endpoint device and the second endpoint device via the flow around address or the flow through address based on results of the connectivity test via ICE.

17. The method of claim 10, further comprising:
    requesting the first endpoint device to perform the connectivity test, via session traversal utilities for network address translation (STUN), to determine reachability of the second endpoint device; and establishing the media stream between the first endpoint device and the second endpoint device via the flow around address or the flow through address based on results of the connectivity test via STUN.

18. The method of claim 10, further comprising establishing a voice over internet protocol (VoIP) call between the first endpoint device and the second endpoint device via the flow around address or the flow through address based on results of the connectivity test.

19. A non-transitory storage medium, comprising:

instructions executable by the processor to receive a message from a first endpoint device, the message includes a flow around address and a flow through address to a second endpoint device;

instructions executable by the processor to request the first endpoint device to perform a first connectivity test to determine reachability of the second endpoint device;

instructions executable by the processor to request the second endpoint device to perform a second connectivity test to determine reachability of the first endpoint device;

and instructions executable by the processor to establish a media stream between the first endpoint device and the second endpoint device via the flow around address or the flow through address based on results of one or more of the first connectivity test and the second connectivity test.

20. The non-transitory storage medium of claim 19, wherein the first connectivity test or the second connectivity test uses one or more of pings, probes, interactive connectivity establishment (ICE), and session traversal utilities for network address translation (STUN).

\* \* \* \* \*